United States Patent
Bachu et al.

(10) Patent No.: US 12,513,740 B2
(45) Date of Patent: Dec. 30, 2025

(54) TECHNIQUES FOR RANDOM ACCESS COMMUNICATION SUPPORT USING REMOTELY-LOCATED NODES IN A WIRELESS NETWORK

(71) Applicant: QUALCOMM Incorporated, San Diego, CA (US)

(72) Inventors: Raja Sekhar Bachu, Kendall Park, NJ (US); Kanchan Kumar Gorain, Somerset, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 414 days.

(21) Appl. No.: 17/928,167

(22) PCT Filed: Jul. 9, 2021

(86) PCT No.: PCT/US2021/041133
§ 371 (c)(1),
(2) Date: Nov. 28, 2022

(87) PCT Pub. No.: WO2022/015596
PCT Pub. Date: Jan. 20, 2022

(65) Prior Publication Data
US 2023/0180288 A1   Jun. 8, 2023

(30) Foreign Application Priority Data

Jul. 15, 2020   (IN) .............................. 202041030101

(51) Int. Cl.
*H04W 74/00*   (2009.01)
*H04L 5/00*   (2006.01)
(Continued)

(52) U.S. Cl.
CPC ......... *H04W 74/006* (2013.01); *H04L 5/0094* (2013.01); *H04L 27/265* (2013.01);
(Continued)

(58) Field of Classification Search
None
See application file for complete search history.

(56) References Cited

U.S. PATENT DOCUMENTS

| 10,313,167 B2 | 6/2019 | Rico Alvarino et al. |
| 10,397,940 B2 | 8/2019 | Krishnamoorthi et al. |

(Continued)

FOREIGN PATENT DOCUMENTS

| CN | 105493582 A | 4/2016 |
| CN | 108353058 A | 7/2018 |

(Continued)

OTHER PUBLICATIONS

International Search Report issued in corresponding International Application No. PCT/US2021/041133 dated Nov. 5, 2021.

(Continued)

*Primary Examiner* — Gerald A Smarth
(74) *Attorney, Agent, or Firm* — Paul M. McAdams; Shumaker & Sieffert, PA

(57) ABSTRACT

Aspects described herein relate to sending, from a distributed unit (DU), a control signal that is transparent to communications on an uplink data channel and a random access channel, receiving, at the DU, a signal from a radio unit (RU) over resources for the random access channel, and decoding a random access communication from the signal at least in part by applying a phase compensation to the signal.

17 Claims, 7 Drawing Sheets

(51) Int. Cl.
H04L 27/26 (2006.01)
H04W 74/0833 (2024.01)

(52) U.S. Cl.
CPC ..... H04L 27/2665 (2013.01); H04W 74/0833 (2013.01); *H04L 27/26025* (2021.01); *H04L 27/2607* (2013.01)

(56) References Cited

U.S. PATENT DOCUMENTS

| | | | |
|---|---|---|---|
| 10,602,543 | B2 | 3/2020 | Sun et al. |
| 11,937,292 | B2 * | 3/2024 | Bertrand ............... H04L 5/0032 |
| 2016/0359653 | A1 * | 12/2016 | Lee ....................... H04L 5/0016 |
| 2018/0198646 | A1 | 7/2018 | Gau et al. |

FOREIGN PATENT DOCUMENTS

| | | | |
|---|---|---|---|
| CN | 110447188 A | 11/2019 | |
| CN | 110612711 A | 12/2019 | |
| CN | 111193682 A | 5/2020 | |
| CN | 111345086 A | 6/2020 | |
| EP | 3041300 A1 | 10/2018 | |
| EP | 3952586 A1 * | 2/2022 | ........ H04W 74/0833 |
| EP | 4023007 B1 * | 10/2024 | ............ H04W 72/20 |
| WO | 2018022216 | 2/2018 | |
| WO | 2018035365 A1 | 2/2018 | |
| WO | 2018237060 A1 | 12/2018 | |

OTHER PUBLICATIONS

International Preliminary Report on Patentability—PCT/US2021/041133, The International Bureau of WIPO—Geneva, Switzerland, Jan. 26, 2023.

O-RAN Alliance: "O-RAN: Towards an Open and Smart RAN," White Paper, Oct. 2018, 19 pages.

O-RAN Fronthaul Working Group: "Control, User and Synchronization Plane Specification", Technical Specification—O-RAN.WG4.CUS. 0-V03.00—O-RAN Fronthaul Working Group: Control, User and Synchronization Plane Specification, O-RAN, vol. O-RAN.WG4.CUS. 0-v03.00, Apr. 1, 2020, pp. 1-253, XP009530675.

Umesh A., et al., "Overview of O-RAN Fronthaul Specifications," NTT Docomo Technical Journal, Jul. 2019, vol. 21, No. 1, pp. 46-59.

* cited by examiner

TECHNIQUES FOR RANDOM ACCESS COMMUNICATION SUPPORT USING REMOTELY-LOCATED NODES IN A WIRELESS NETWORK

CLAIM OF PRIORITY

This application is a 35 U.S.C. § 371 National Phase of PCT Application No. PCT/US2021/041133, entitled "TECHNIQUES FOR RANDOM ACCESS COMMUNICATION SUPPORT USING REMOTELY-LOCATED NODES IN A WIRELESS NETWORK" filed Jul. 9, 2021, which claims priority to Indian Patent Application No. 202041030101, entitled "TECHNIQUES FOR RANDOM ACCESS COMMUNICATION SUPPORT USING REMOTELY-LOCATED NODES IN A WIRELESS NETWORK" filed Jul. 15, 2020, which are assigned to the assignee hereof and hereby expressly incorporated by reference herein for all purposes.

BACKGROUND

Aspects of the present disclosure relate generally to wireless communication systems, and more particularly, to communication between nodes of an open radio access network (O-RAN).

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as 5G new radio (5G NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information.

O-RAN architectures have been proposed that include distributed units (DUs) and radio units (RUs) to provide lower layer communication support. A DU can provide radio link control (RLC), media access control (MAC), and higher physical (PHY) layer support, while one or more RUs can provide lower PHY layer and radio frequency (RF) support. The one or more RUs can communicate with the DU over a front haul (FH) interface to provide end-to-end communication between nodes communicating with the RUs with nodes communicating with the DU. For example, the one or more RUs can communicate with a user equipment (UE) or other downstream nodes and the DU may communicate with central unit (CU) or other upstream nodes to access a core network.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an aspect, a method of wireless communication is provided. The method includes sending, from a distributed unit (DU) to a radio unit (RU), a control signal that is transparent to communications on an uplink data channel and a random access channel, receiving, at the DU, a signal from the RU over resources for the random access channel, and decoding a random access communication from the signal at least in part by applying a phase compensation to the signal.

In another aspect, a method for wireless communication is provided. The method includes receiving, at a RU, a control signal that is transparent to communications on an uplink data channel and a random access channel, receiving, at the RU, a signal over resources for the random access channel, removing, based on the control signal, a cyclic prefix associated with the uplink data channel from one or more symbols of the signal, performing a fast Fourier transform (FFT) of the one or more symbols to extract a frequency domain random access communication from the signal, and sending, to a distributed unit (DU), the frequency domain random access communication.

In another aspect, an apparatus for wireless communication is provided that includes a transceiver, a memory configured to store instructions, and one or more processors communicatively coupled with the memory and the transceiver. The one or more processors are configured to execute the instructions to cause the apparatus to send, to a RU, a control signal that is transparent to communications on an uplink data channel and a random access channel, receive a signal from the RU over resources for the random access channel, and decode a random access communication from the signal at least in part by applying a phase compensation to the signal to extract a random access communication from the signal.

In another aspect, an apparatus for wireless communication is provided that includes means for sending, to a RU, a control signal that is transparent to communications on an uplink data channel and a random access channel, means for receiving a signal from the RU over resources for the random access channel, and means for decoding a random access communication from the signal at least in part by applying a phase compensation to the signal.

In another aspect, a computer-readable medium is provided that includes code executable by one or more processors for wireless communications. The code includes code for sending, by a DU to a RU, a control signal that is transparent to communications on an uplink data channel and a random access channel, receiving, by the DU, a signal from the RU over resources for the random access channel, and decoding a random access communication from the signal at least in part by applying a phase compensation to the signal.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
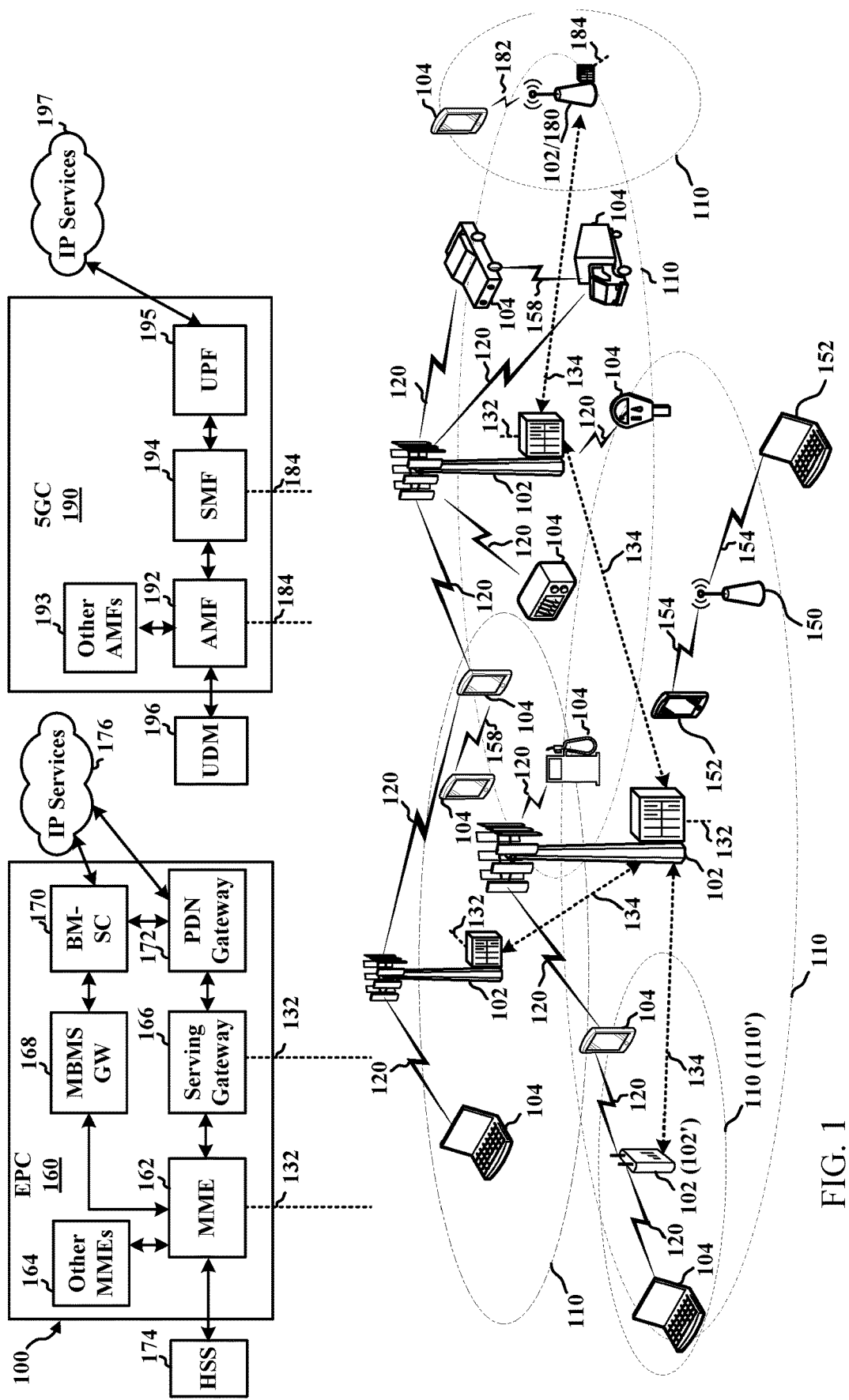
FIG. 1 illustrates an example of a wireless communication system, in accordance with various aspects of the present disclosure.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The described features generally relate to supporting random access communications using remotely-located nodes in a wireless network. For example, in open radio access networks (O-RANs), lower layer network communications can occur using remotely-located nodes, such as by using a distributed node (DU) for radio link control (RLC), media access control (MAC), and higher physical (PHY) layer support, and one or more radio units (RUs) for lower PHY layer and radio frequency (RF) support. The one or more RUs and the DU can communicate using a front haul (FH) interface that can be based on defined section type messages having message formats known by the one or more RUs and the DU. The one or more RUs and the DU can communicate using section type messages in a control plane (CP) to indicate parameters for user plane (UP) communications, and can communicate using section type messages in the UP.

The UP communications between the RU and DU can relate to communications between downstream nodes with which the one or more RUs communicate (e.g., user equipment (UE)) and upstream nodes with which the DU communicates (e.g., a central unit (CU), core network nodes, etc.). For example, UP can carry uplink and downlink data corresponding to different physical channels (e.g., physical random access channel (PRACH), physical uplink control channel (PUCCH), physical broadcast channel (PBCH), demodulation reference signal (DMRS), physical downlink control channel (PDCCH), physical downlink shared channel (PDSCH), sounding reference signal (SRS), phase tracking reference signal (PTRS), channel state information reference signal (CSI-RS) etc.) from DU to RU (e.g., downlink) and RU to DU (e.g., uplink). In addition, for example, a CU can provide additional higher layer network support, such as radio resource control (RRC) or packet data convergence protocol (PDCP) layer support, and may facilitate communications with one or more core networks (e.g., a 5G core, evolved packet core, etc.).

The control, user and synchronization plane specification for the O-RAN FH interface currently defines multiple section type messages for CP and UP communications, including section type 1, which is indicated for most downlink and uplink physical radio channels, and section type 3, which is indicated for PRACH and mixed-numerology channels. Each section type has defined parameters that are indicated and included when transmitting messages of the given section type. As compared to the section type 1 message, the section type 3 message may have additional parameters for PRACH and mixed-numerology channels, such as time offset, frequency offset, frame structure, cyclic prefix (CP) length, etc., which may be used for PRACH and mixed-numerology channels communications but may not generally be needed for downlink and uplink physical radio channels. In aspects described herein, however, there can be some instances where a DU may send section type 1 message for PRACH processing. For example, if a RU does not support mixed numerology, it may not use section type 3 messages. In this or other examples, a section type 1 message may be used by DU for PRACH with reduced RU complexity and acceptable detection performance.

For example, a RU can receive a random access communication (e.g., PRACH) from a UE with same numerology as physical uplink shared channel (PUSCH) to perform a random access procedure for connecting the UE with the network via the RU, an associated DU, CU, core network components, etc. The RU process the random access communication similarly as a non-random access communication (e.g., as a PUSCH communication) based on at least one of removing a cyclic prefix (CP) from one or more symbols of the random access communication, performing a FFT to produce an associated frequency domain signal, and providing the frequency domain signal to the DU for further processing. In this regard, for example, the RU may not distinguish between random access communications or associated channel (e.g., PRACH) and regular uplink data or associated channel (e.g., PUSCH). As such, the RU can remove a CP associated with uplink data (e.g., with PUSCH) from the random access communication in generating the frequency domain signal. In an example, before further processing of the random access communication, the DU receiving the frequency domain signal can apply a phase compensation to compensate for a shift introduced due to the RU removing the CP associated with uplink data from the random access communication (e.g., instead of removing a CP associated with PRACH).

In this regard, the RU need not differentiate between random access communication and uplink data and can use one FFT for both types of communications. This can reduce cost and complexity of RUs as the RU can use the same chain for processing both types of communications (e.g., both PRACH and PUSCH). Thus, the RU can be transparent to providing PRACH or PUSCH data from UEs to the DU, and the DU can use section type 1 messages for both types of communications. Section type 1 message can be used by DU for PRACH with numerology different than PUSCH numerology as well where additional processing specific to mixed numerology can be performed by the DU. As the section type 1 messages can be used for both types of communication, communication resources between the RU and DU can be conserved as well as the section type 1 message can have a lesser number of parameters than section type 3 messages.

The described features will be presented in more detail below with reference to FIGS. 1-7.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal.

Techniques described herein may be used for various wireless communication systems such as CDMA, TDMA, FDMA, OFDMA, SC-FDMA, and other systems. The terms "system" and "network" may often be used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to fifth generation (5G) new radio (NR) networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Various aspects or features will be presented in terms of systems that can include a number of devices, components, modules, and the like. It is to be understood and appreciated that the various systems can include additional devices, components, modules, etc. and/or may not include all of the devices, components, modules etc. discussed in connection with the figures. A combination of these approaches can also be used.

FIG. 1 is a diagram illustrating an example of a wireless communications system and an access network 100. The wireless communications system (also referred to as a wireless wide area network (WWAN)) can include base stations 102, UEs 104, an Evolved Packet Core (EPC) 160, and/or a 5G Core (5GC) 190. The base stations 102 may include macro cells (high power cellular base station) and/or small cells (low power cellular base station). The macro cells can include base stations. The small cells can include femtocells, picocells, and microcells. In an example, the base stations 102 may also include gNBs 180, as described further herein.

The base stations 102 configured for 4G LTE (which can collectively be referred to as Evolved Universal Mobile Telecommunications System (UMTS) Terrestrial Radio Access Network (E-UTRAN)) may interface with the EPC 160 through backhaul links 132 (e.g., using an Si interface). The base stations 102 configured for 5G NR (which can collectively be referred to as Next Generation RAN (NG-RAN)) may interface with 5GC 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., using an X2 interface). The backhaul links 134 may be wired or wireless.

The base stations 102 may wirelessly communicate with one or more UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be referred to as a heterogeneous network. A heterogeneous network may also include Home Evolved Node Bs (eNBs) (HeNBs), which may provide service to a restricted group, which can be referred to as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (e.g., for x component carriers) used for transmission in the DL and/or the UL direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

In another example, certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 104 to compensate for the extremely high path loss and short range. A base station 102 referred to herein can include a gNB 180.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a packet-switched (PS) Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 can be a control node that processes the signaling between the UEs 104 and the 5GC 190. Generally, the AMF 192 can provide QoS flow and session management. User Internet protocol (IP) packets (e.g., from one or more UEs 104) can be transferred through the UPF 195. The UPF 195 can provide UE IP address allocation for one or more UEs, as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). IoT UEs may include machine type communication (MTC)/enhanced MTC (eMTC, also referred to as category (CAT)-M, Cat M1) UEs, NB-IoT (also referred to as CAT NB1) UEs, as well as other types of UEs. In the present disclosure, eMTC and NB-IoT may refer to future technologies that may evolve from or may be based on these technologies. For example, eMTC may include FeMTC (further eMTC), eFeMTC (enhanced further eMTC), mMTC (massive MTC), etc., and NB-IoT may include eNB-IoT (enhanced NB-IoT), FeNB-IoT (further enhanced NB-IoT), etc. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

As described in examples herein, wireless communication access network 100 can be a O-RAN, where certain nodes can be split into DUs and RUs, as described above and further herein. For example, a base station 102 or gNB 180 may be split into a DU and one or more RUs, where the one or more RUs can be remotely-located and can provide lower physical layer and RF functionality for the DU. As such, UEs 104 can communicate with the one or more RUs via RF functionality, where the one or more RUs can communicate with the DU, and the DU can communicate with other network nodes, such as a CU, EPC 160 nodes, 5GC 190 nodes, etc. to facilitate communicating with the UE 104. The one or more RUs and DU can communicate over a FH interface. One specific example of an O-RAN is shown in FIG. 2.

Figure 2:
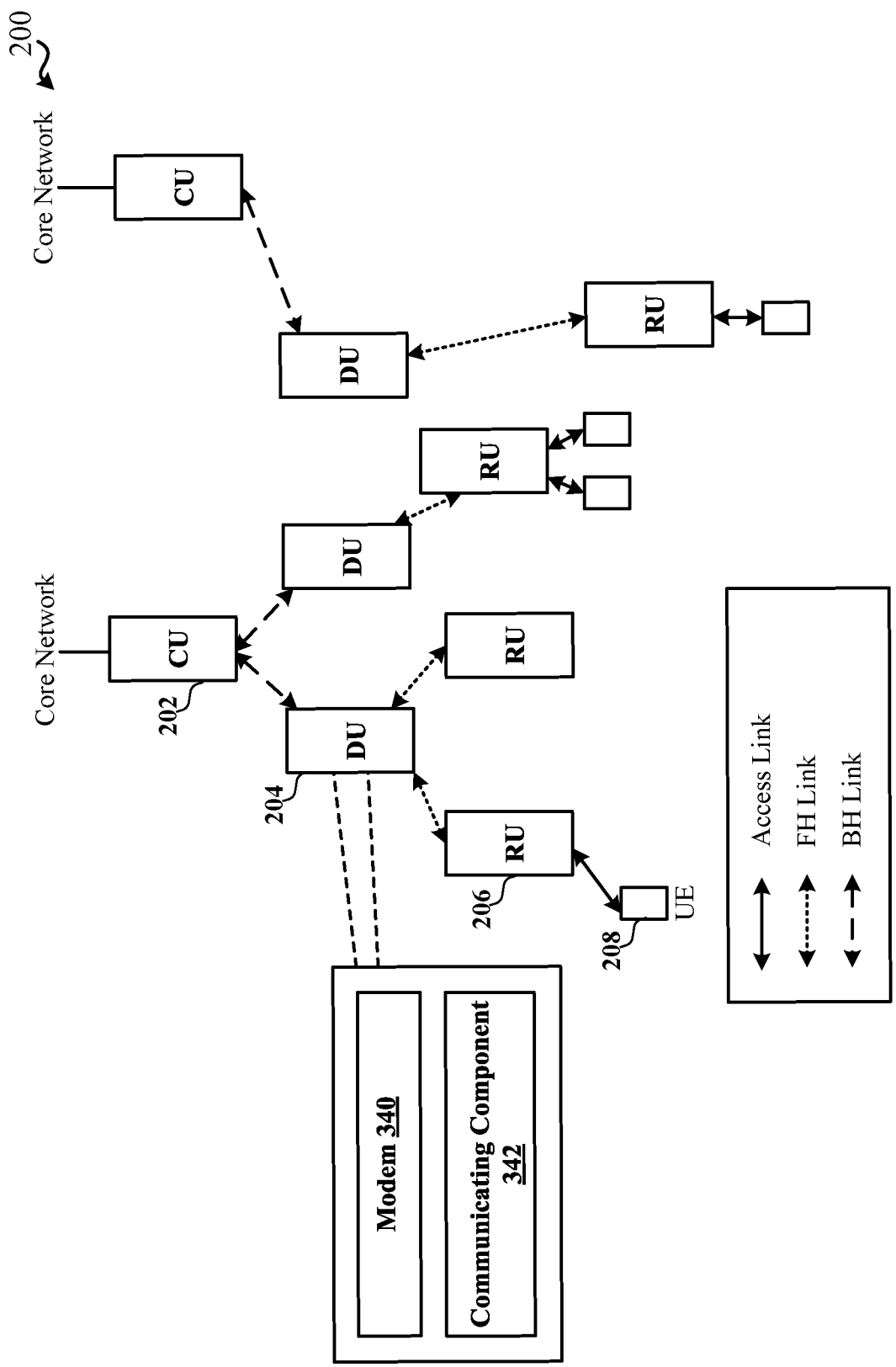
FIG. 2 illustrates an example of a wireless communication system for an open radio access network (O-RAN), in accordance with various aspects of the present disclosure.

Referring to FIG. 2, in accordance with various aspects described herein, an example of O-RAN 200 is depicted. The O-RAN 200 can include one or more CUs 202 that can provide a connection to a core network, such as an EPC 160, 5GC 190, etc. A CU 202 can communicate with one or more DUs 204, where a DU can be provided at a base station or gNB and can provide some network functions, such as RLC, MAC, higher layer PHY, etc. functions. A DU 204 can communicate with one or more RUs 206, which can provide lower layer network functions, such as lower layer PHY and/or RF functions, as described. Thus, the one or more RUs 206 can provide direct RF connection with one or more UEs 208 or other nodes.

In an example, the CU 202 can include a wireline connection to a core network (e.g., one or more backend network components, such as one or more components in EPC 160, 5GC 190, etc., as described in FIG. 1). The DU 204 can communicate with a CU 202 over a backhaul (BH) link, the RU 206 can communicate with a DU 204 over a FH link, and UEs 208 can communicate with a RU 206 over an access link. In the FH link, the DU 204 and RU 206 can use a FH interface to communicate certain messages, which can include section type messages, such as those defined in O-RAN Fronthaul Working Group Control, User and Synchronization planes specification. Such messages may include, for example, section type 1 messages, section type 3 messages, other messages, etc. The DU 204 and RU 206 can communicate CP messages indicating parameters for UP messages, where the UP messages can carry downlink communications from core network nodes that are intended for a UE 208, uplink messages from the UE 208 that are intended for core network nodes, etc.

Figure 3:
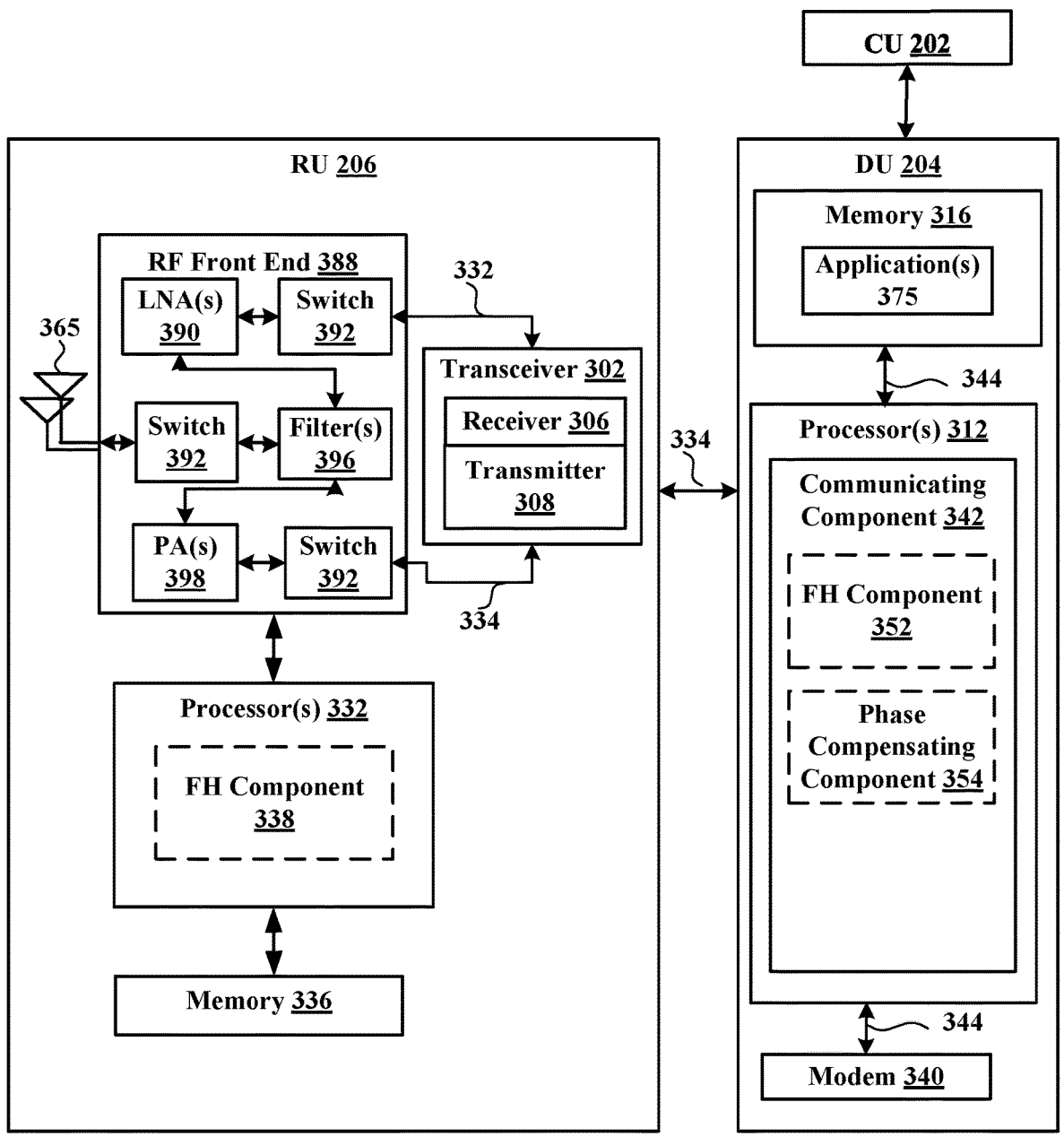
FIG. 3 is a block diagram illustrating an example of a radio unit (RU) and a distributed unit (DU), in accordance with various aspects of the present disclosure.
Figure 4:
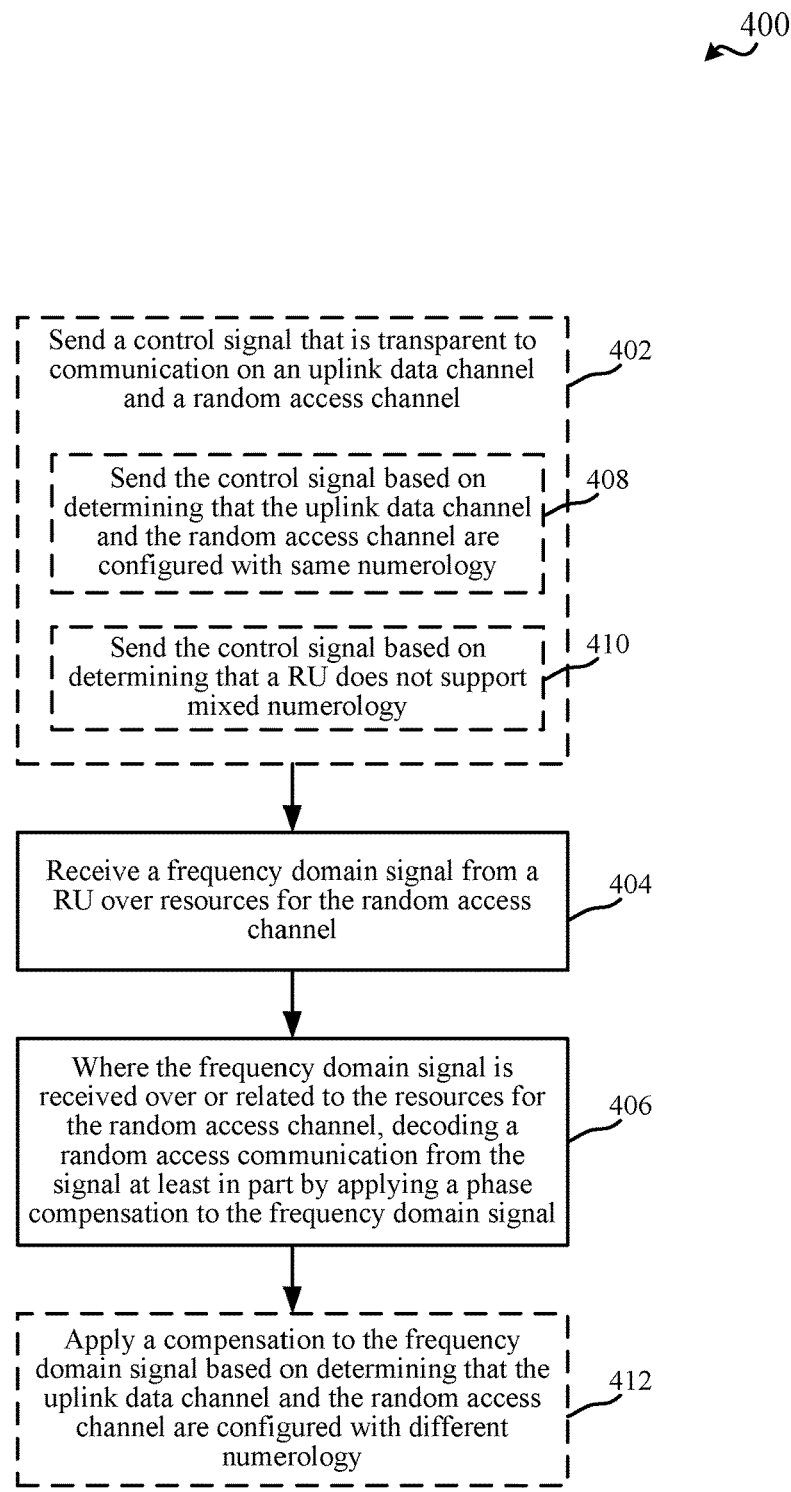
FIG. 4 is a flow chart illustrating an example of a method for processing random access communications from a RU, in accordance with various aspects of the present disclosure.
Figure 5:
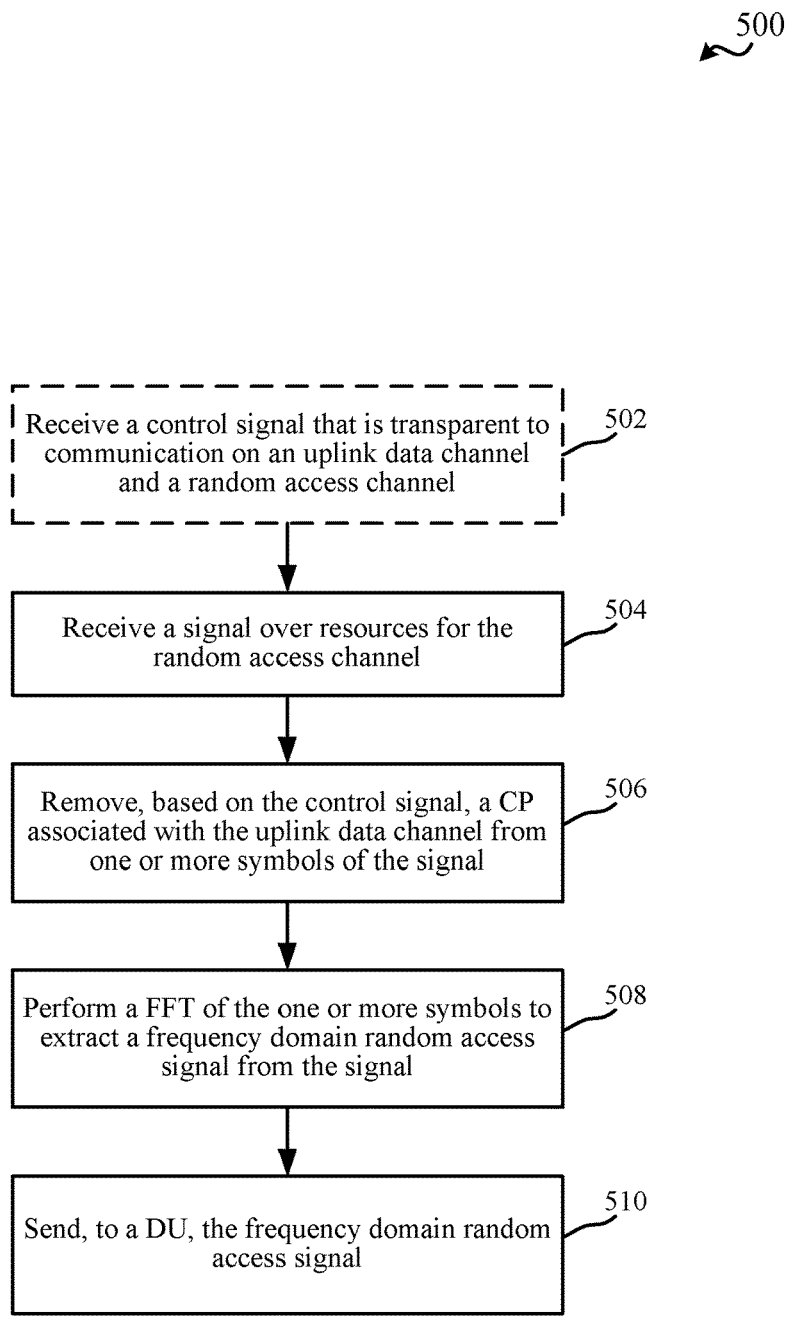
FIG. 5 is a flow chart illustrating an example of a method for sending random access communications to a DU, in accordance with various aspects of the present disclosure.

Turning now to FIGS. 3-7, aspects are depicted with reference to one or more components and one or more methods that may perform the actions or operations described herein, where aspects in dashed line may be optional. Although the operations described below in FIGS. 4 and 5 are presented in a particular order and/or as being performed by an example component, it should be understood that the ordering of the actions and the components performing the actions may be varied, depending on the implementation. Moreover, it should be understood that the following actions, functions, and/or described components may be performed by a specially programmed processor, a processor executing specially programmed software or computer-readable media, or by any other combination of a hardware component and/or a software component capable of performing the described actions or functions.

Referring to FIG. 3, one example of an implementation of a DU 204 and a RU 206 may include a variety of components, some of which have already been described above and are described further herein. In addition, the RU 206 can perform RF functions for the DU 204, and as such may include associated components such as a RF front end 388, antennas 365, transceiver 302, etc., which may be in communication via one or more buses 332, and/or may also include one or more processors 332 and/or memory 336 for processing communications received from, or to send to, DU 204. DU 204 may include components for processing communications at higher network layers, and may include one or more processors 312, memory 316, modem 340, etc., which can be in communication via one or more buses 344. As described, for example, DU 204 and RU 206 can communicate using a FH interface 334, which can be over a wired communication medium (e.g., Ethernet) or wireless communication medium, such as by using RF front end 388 components described herein and/or other components to facilitate wireless communications at the RU 206 and DU 204.

In an aspect, the one or more processors 312 can include a modem 340 and/or can be part of the modem 340 that uses one or more modem processors. Thus, the various functions related to communicating component 342 may be included in modem 340 and/or processors 312 and, in an aspect, can be executed by a single processor, while in other aspects, different ones of the functions may be executed by a combination of two or more different processors. For example, in an aspect, the one or more processors 312 may include any one or any combination of a modem processor, or a baseband processor, or a digital signal processor. The one or more processors 312 and/or one or more processors 332 may include a transmit processor, or a receiver processor, or a transceiver processor associated with transceiver 302. In other aspects, some of the features of the one or more processors 312 and/or processors 332 and/or modem 340 associated with communicating component 342 or FH component 338, as described herein, may be performed by transceiver 302.

Also, memory 316 may be configured to store data used herein and/or local versions of applications 375 or communicating component 342 and/or one or more of its subcomponents being executed by at least one processor 312. Memory 316 and/or memory 336 can include any type of computer-readable medium usable by a computer or at least one processor 312, such as random access memory (RAM), read only memory (ROM), tapes, magnetic discs, optical discs, volatile memory, non-volatile memory, and any combination thereof. In an aspect, for example, memory 316 may be a non-transitory computer-readable storage medium that stores one or more computer-executable codes defining communicating component 342 and/or one or more of its subcomponents, and/or data associated therewith, when DU 204 is operating at least one processor 312 to execute communicating component 342 and/or one or more of its subcomponents. Similarly, for example, memory 336 may be a non-transitory computer-readable storage medium that stores one or more computer-executable codes defining FH component 338, and/or data associated therewith, when RU 206 is operating at least one processor 332 to execute FH component 338.

Transceiver 302 may include at least one receiver 306 and at least one transmitter 308. Receiver 306 may include hardware, firmware, and/or software code executable by a processor for receiving data, the code comprising instructions and being stored in a memory (e.g., computer-readable medium). Receiver 306 may be, for example, a radio frequency (RF) receiver. In an aspect, receiver 306 may receive signals transmitted by an upstream node, a downstream node, etc. Additionally, receiver 306 may process such received signals, and also may obtain measurements of the signals, such as, but not limited to, Ec/Io, SNR, RSRP, RSSI, etc. Transmitter 308 may include hardware, firmware, and/or software code executable by a processor for transmitting data, the code comprising instructions and being stored in a memory (e.g., computer-readable medium). A suitable example of transmitter 308 may including, but is not limited to, an RF transmitter.

Moreover, in an aspect, RU 206 may include RF front end 388, which may operate in communication with one or more antennas 365 and transceiver 302 for receiving and transmitting radio transmissions, for example, wireless communications transmitted by at least one base station 102 or wireless transmissions transmitted by RU 206. RF front end 388 may be connected to one or more antennas 365 and can include one or more low-noise amplifiers (LNAs) 390, one or more switches 392, one or more power amplifiers (PAs) 398, and one or more filters 396 for transmitting and receiving RF signals.

In an aspect, LNA 390 can amplify a received signal at a desired output level. In an aspect, each LNA 390 may have a specified minimum and maximum gain values. In an aspect, RF front end 388 may use one or more switches 392 to select a particular LNA 390 and its specified gain value based on a desired gain value for a particular application.

Further, for example, one or more PA(s) 398 may be used by RF front end 388 to amplify a signal for an RF output at a desired output power level. In an aspect, each PA 398 may have specified minimum and maximum gain values. In an aspect, RF front end 388 may use one or more switches 392 to select a particular PA 398 and its specified gain value based on a desired gain value for a particular application.

Also, for example, one or more filters 396 can be used by RF front end 388 to filter a received signal to obtain an input RF signal. Similarly, in an aspect, for example, a respective filter 396 can be used to filter an output from a respective PA 398 to produce an output signal for transmission. In an aspect, each filter 396 can be connected to a specific LNA 390 and/or PA 398. In an aspect, RF front end 388 can use one or more switches 392 to select a transmit or receive path using a specified filter 396, LNA 390, and/or PA 398, based on a configuration as specified by transceiver 302 and/or processor 312.

As such, transceiver 302 may be configured to transmit and receive wireless signals through one or more antennas 365 via RF front end 388. In an aspect, transceiver 302 may be tuned to operate at specified frequencies such that RU 206 can communicate with, for example, one or more upstream nodes (e.g., DU 204) or one or more cells associated with one or more upstream nodes, one or more downstream nodes, such as one or more UEs, etc. In an aspect, for example, modem 340 can configure transceiver 302 to operate at a specified frequency and power level based on a configuration of the DU 204 and/or RU 206 and the communication protocol used by modem 340.

In an aspect, modem 340 can be a multiband-multimode modem, which can process digital data and communicate with transceiver 302 such that the digital data is sent and received using transceiver 302. In an aspect, modem 340 can be multiband and be configured to support multiple frequency bands for a specific communications protocol. In an aspect, modem 340 can be multimode and be configured to support multiple operating networks and communications protocols. In an aspect, modem 340 can control one or more components of RU 206 (e.g., RF front end 388, transceiver 302) to enable transmission and/or reception of signals from a UE or network based on a specified modem configuration. In an aspect, the modem configuration can be based on the mode of the modem and the frequency band in use.

In an aspect, the processor(s) 312 and/or 332 may correspond to one or more of the processors described in connection with the base station in FIG. 7. Similarly, the memory 316 and/or 336 may correspond to the memory described in connection with the base station in FIG. 7. Moreover, for example, the transceiver 302 can include various transmit and/or receive hardware described in connection with the base station in FIG. 7, such as a transmit or receive processor, a transmit or receive MIMO processor or detector, etc. In addition, for example, modem 340 can include a transmit or receive modulator or demodulator described in connection with the base station in FIG. 7. Also, in an example, antennas 365 can include transmit or receive antennas described in connection with the base station in FIG. 7.

In addition, for example, communicating component 342 can include a FH component 352 for communicating with the RU over a FH interface 334, which may include using one or more section type messages for CP or UP communications, and/or a phase compensating component 354 for applying a phase compensation to certain frequency domain signals received from the RU 206. RU 206 can also include a FH component 338, in one example, for communicating with the DU over a FH interface 334, which may include using one or more section type messages for CP or UP communications.

FIG. 4 illustrates a flow chart of an example of a method 400 for processing frequency domain signals received from an RU, in accordance with aspects described herein. In an example, a DU 204 can perform the functions described in method 400 using one or more of the components described in FIGS. 2 and 3. FIG. 5 illustrates a flow chart of an example of a method 500 for sending frequency domain signals to a DU, in accordance with aspects described herein. In an example, a RU 206 can perform the functions described in method 500 using one or more of the components described in FIGS. 2 and 3. Though methods 400 and 500 are described in conjunction with one another for ease of explanation, the methods 400 and 500 are not required to be performed together, and indeed different devices can independently perform either method 400 or method 500, or portions thereof, without requiring the other method.

In method 400, optionally at Block 402, a control signal that is transparent to communication on an uplink data channel and a random access channel can be sent. In an aspect, FH component 352, e.g., in conjunction with processor(s) 312, memory 316, communicating component 342, etc., can send the control signal that is transparent to communication on the uplink data channel (e.g., PUSCH) and the random access channel (e.g., PRACH). In this example, the control signal being "transparent" to communication on the uplink data channel and the random access channel can refer the control signal being the same for both uplink data channel and random access channel or otherwise not specific to either one of the uplink data channel or the random access channel. In this regard, with the control signal being transparent to communication on the uplink data channel and the random access channel, the same control signal format or type (e.g., section type 1 message, as described below) can be used to specify parameters for both uplink data channel and random access channel communications (or uplink communications in general). In this regard, for example, the RU may treat both types of signals from the UE (e.g., signals including uplink data channel communications and signals including random access channel communications) the same based on the control signal.

For example, the control signal can indicate one or more parameters for transmitting uplink communications from UEs to the DU, and FH component 352 can send the control signal to a RU 206 over a FH interface 334. For example, the control signal may include a section type message, such as a section type 1 message or other message that can be indicated for uplink communications. The one or more parameters indicated in the control signal, for example, can include parameters that can indicate resources, or can be used to derive an indication of resources, over which the RU can transmit uplink communications from a UE to the DU.

In method 500, optionally at Block 502, a control signal that is transparent to communication on an uplink data channel and a random access channel can be received. In an aspect, FH component 338, e.g., in conjunction with processor(s) 332, memory 336, etc., can receive the control signal that is transparent to communication on the uplink data channel and the random access channel. In this example, FH component 338 can receive the control signal from the DU 204 over the FH interface 334. In an example, FH component 338 can derive, from the control signal, resources over which the UE can communicate signals to the RU 206. In one example, the control signal can specify resources for a random access channel, which the DU 204 can establish, but to which the RU 206 can remain agnostic (with respect to differentiating the random access channel from other uplink channels). For example, the RU 206 can transmit communications received from the UE over the random access channel resources as it would transmit communications received from the UE over uplink data channel resources, as the control signal from the DU 204 may not differentiate between the two types of communications.

In method 500, at Block 504, a signal can be received over resources for the random access channel. In an aspect, transceiver 302, e.g., in conjunction with processor(s) 332, memory 336, etc., can receive the signal over the resources for the random access channel (e.g., as indicated in the control signal). As described, the resources may not be distinguished to the RU 206 as random access channel resources (as opposed to uplink data channel resources, or more generically, resources related to section type 1 messages). Transceiver 302 can receive the signal from a UE that is performing random access with the RU 206 and DU 204 (and/or CU 202) to establish a connection thereto for communicating with a core wireless network. For example, the random access channel resources can be communicated to the UE using one or more broadcast signals that broadcast information for communicating with the RU 206, DU 204, CU 202, etc., such as a system information block (SIB) or other RRC signaling, which can originate from the DU 204. As such, the DU 204 can determine and specify the resources for the random access channel, such that the DU 204 can differentiate random access channel communications from other uplink communications based at least on the resources over which the random access channel communications are received at the RU 206 (from the UE) and/or at the DU 204 (from the RU 206, which can be based on the parameters indicated in the control signal). The RU 206 may not, or may not need to, make the distinction between random access channel communications and other uplink communications, as described.

In method 500, at Block 506, a CP associated with the uplink data channel can be removed, based on the control signal, from one or more symbols of the signal. In an aspect, FH component 338, e.g., in conjunction with processor(s) 332, memory 336, etc., can remove, based on the control signal, the CP associated with the uplink data channel from the one or more symbols of the signal. In one example, the control signal may indicate a CP length for communications of the uplink data channel. As such, FH component 338 can remove the CP associated with the uplink data channel from the one or more symbols, though a CP used by the UE in generating the communications for the random access channel may be of a different length than that for the uplink data channel. An example is shown in FIG. 6.

Figure 6:
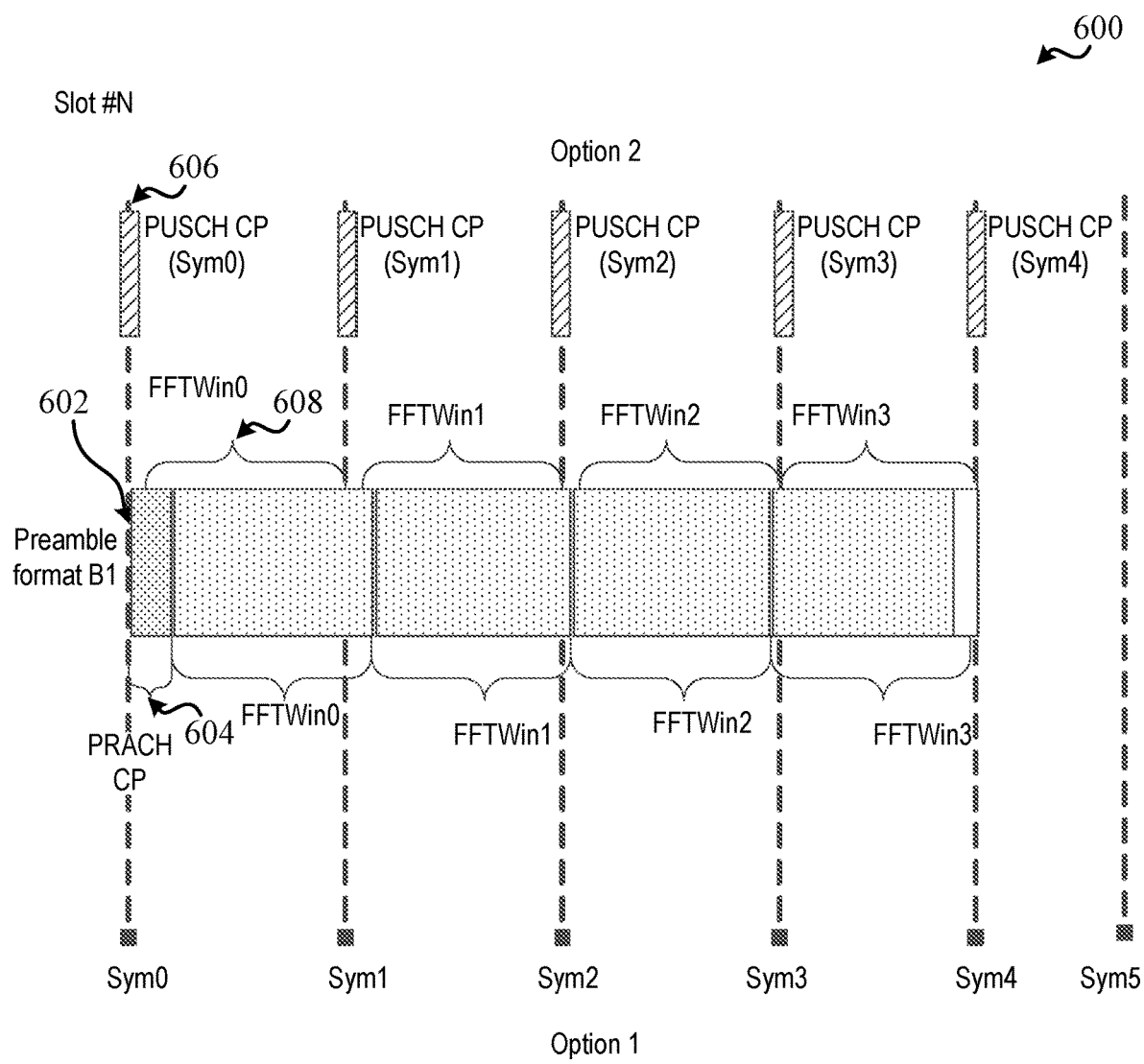
FIG. 6 illustrates processing of a random access signal received from a user equipment, in accordance with various aspects of the present disclosure.

FIG. 6 illustrates an example of symbols 600 of a received signal 602 and associated possible CPs and FFT windows with the CP removed. As shown, signal 602 may be received with a PRACH CP 604, which can be of a different length and/or configuration than a PUSCH CP. The RU, however, may be agnostic to PUSCH and PRACH signals, and may remove the CP based on the length and/or configuration specified in the control signal received from the DU. As such, the RU can remove the PUSCH CP 606 from each symbol of the signal, and can set the FFT window 608 after the PUSCH CP for performing FFT to derive a frequency domain signal of the random access communication for further processing (e.g., to extract the PRACH subcarrier). Though this may result in slight misalignment of the FFT window, it may be close enough to generate a frequency domain signal that can be processed by the DU, and as described further herein, the DU may apply a phase compensation to the frequency domain signal (to the IQ) to account for the misalignment (e.g., the shift introduced due to the FFT window shift). In this regard, the deterministic phase compensation (for shifted FFT window) can be comfortably done at DU on the frequency domain IQ samples. Moreover, in this regard as described, RU can use only one FFT for PRACH and PUSCH together, and RU may not need a separate chain for PRACH and PUSCH processing, which can reduce the O-RU cost and complexity. Additionally, for example, RU can be transparent to PRACH or PUSCH data, and hence Section type 1 can be comfortably used by the DU to receive the PRACH data.

In addition, in an example, the uplink data channel and the random access channel may be of different numerologies. In an example, the RU can still process the signal as it would an uplink data channel signal to generate the frequency domain random access signal in the same way, and the DU can account for difference in numerology between the channels based on one or more determinations on the received signal. For example, the one or more determinations may include determining that the frequency domain random access signal is received over the random access channel resources, as scheduled or otherwise indicated by the DU.

In method 500, at Block 508, a FFT of the one or more symbols can be performed to extract a frequency domain random access signal from the signal. In an aspect, FH component 338, e.g., in conjunction with processor(s) 332, memory 336, etc., can perform the FFT of the one or more symbols to extract the frequency domain random access signal from the signal or otherwise put the symbols in the frequency domain for further processing by the DU. As described, for example, FH component 338 can perform the FFT based on an FFT window that can be set after the PUSCH CP length from the start of the symbol for each of the one or more symbols. In this regard, for example, FH component 338 can perform the FFT of the one or more symbols as if the signal is an uplink data channel communication, as the RU 206 can be agnostic to whether communications received over resources indicated in a section type 1 message are for uplink data channel communications or random access channel communications.

In method 500, at Block 510, the frequency domain random access signal can be sent to a DU. In an aspect, FH component 338, e.g., in conjunction with processor(s) 332, memory 336, etc., can send, to the DU (e.g., DU 204), the frequency domain random access signal. For example, FH component 338 can send the frequency domain random access signal to the DU 204 over the FH interface 334.

In method 400, at Block 404, a frequency domain signal can be received from a RU over resources for the random access channel. In an aspect, FH component 352, e.g., in conjunction with processor(s) 312, memory 316, communicating component 342, etc., can receive the frequency domain signal from the RU (e.g., RU 206), which may be over resources for the random access channel. For example, the resources for the random access channel can be indicated in the control signal sent (e.g., at Block 402) to the RU 206. Accordingly, in an example, FH component 352 can determine the communication is from the random access channel based on the resources (e.g., time and/or frequency resources) over which the frequency domain signal is received. Moreover, as described, the frequency domain signal may be provided based on removing a PUSCH CP from symbols of the signal and performing FFT of the symbols to put the frequency domain signal in the frequency domain (e.g., by the RU), as described with respect to FIGS. 5 and 6 above.

In method 400, at Block 406, where the frequency domain signal is received over or related to resources for the random access channel, a random access communication from the signal can be decoded at least in part by applying a phase compensation to the frequency domain signal. In an aspect, phase compensating component 354, e.g., in conjunction with processor(s) 312, memory 316, communicating component 342, etc., can, where the frequency domain signal is received over or related to the resources for the random access channel, decode a random access communication from the signal at least in part by applying the phase compensation to the frequency domain signal. For example, phase compensating component 354 can determine that the frequency domain signal is received over, or is otherwise related to, the resources scheduled by the DU 204 for random access communication, and may apply the phase compensation based on this determination. In addition, in an example, phase compensating component 354 can further determine that the frequency domain signal is received over, or is otherwise related to, the resources indicated in, or otherwise corresponding to, the section type 1 message used for PRACH, and may apply the phase compensation based on this determination.

For example, phase compensating component 354 can apply the per symbol phase compensation that is based on the PUSCH CP and the PRACH CP. For example, the phase compensation may be based on or account for a phase difference that may result from a difference in length and/or structure/configuration between the PUSCH CP and the PRACH CP. In this regard, for example, the phase compensation can be such that a PUSCH-configured FFT window used for PUSCH after CP removal (e.g., as shown in Option 2 of FIG. 6) overlaps with a PRACH-configured FFT window used for PRACH after CP removal (as shown in Option 1 of FIG. 6). This phase compensation can account for the difference in phase caused by the CP removed by the RU 206 and the actual CP in the signal sent by the UE, and this phase compensation may thus improve processing of the signal to decode or otherwise extract the random access communication therefrom.

In an example, in sending the control signal at Block 402, optionally at Block 408, the control signal can be sent based on determining that the uplink data channel and the random access channel are configured with same numerology. In an aspect, FH component 352, e.g., in conjunction with processor(s) 312, memory 316, communicating component 342, etc., can send the control signal based on determining that the uplink data channel and the random access channel are configured with same numerology (e.g., the same subcarrier spacing (SCS)). For example, FH component 352 can determine that the uplink data channel and the random access channel as supported by the RU 206 are of the same numerology. In an example, where the FH component 352 determines that the RU 206 supports both section type 1 and section type 3 messages, but determines that section type 1 can be used for PRACH and PUSCH, FH component 352 can send the control signal as section type 1 for PRACH and PUSCH.

In an example, in sending the control signal at Block 402, optionally at Block 410, the control signal can be sent based on determining that the RU does not support mixed numerology. In an aspect, FH component 352, e.g., in conjunction with processor(s) 312, memory 316, communicating component 342, etc., can send the control signal based on determining that the RU (e.g., RU 206) does not support mixed numerology. For example, FH component 352 can determine that the RU 206 does not support mixed numerology or section type 3, and can accordingly send the control signal as section type 1 for PRACH and PUSCH. In either case, the RU 206 can treat PRACH and PUSCH communications similarly in applying CP and FFT, etc.

In another example, in method 400, optionally at Block 412, a compensation can be applied to the frequency domain signal based on determining that the uplink data channel and the random access channel are configured with different numerology. In an aspect, communicating component 342, e.g., in conjunction with processor(s) 312, memory 316, etc., can apply the compensation to the frequency domain signal based on determining that the uplink data channel and the random access channel are configured with different numerology. For example, communicating component 342 can apply some compensation in the form of a phase compensation (e.g., as part of the phase compensation of Block 406 or an additional phase compensation) or offset, or other processing, that can account for different in numerology (e.g., SCS) between the uplink data channel and the random access channel to decode the random access communication from the signal.

Accordingly, in various examples described above, it can be specified that section type 1 can be used for PRACH when RU does not support section type 3 or otherwise to reduce RU complexity.

Figure 7:
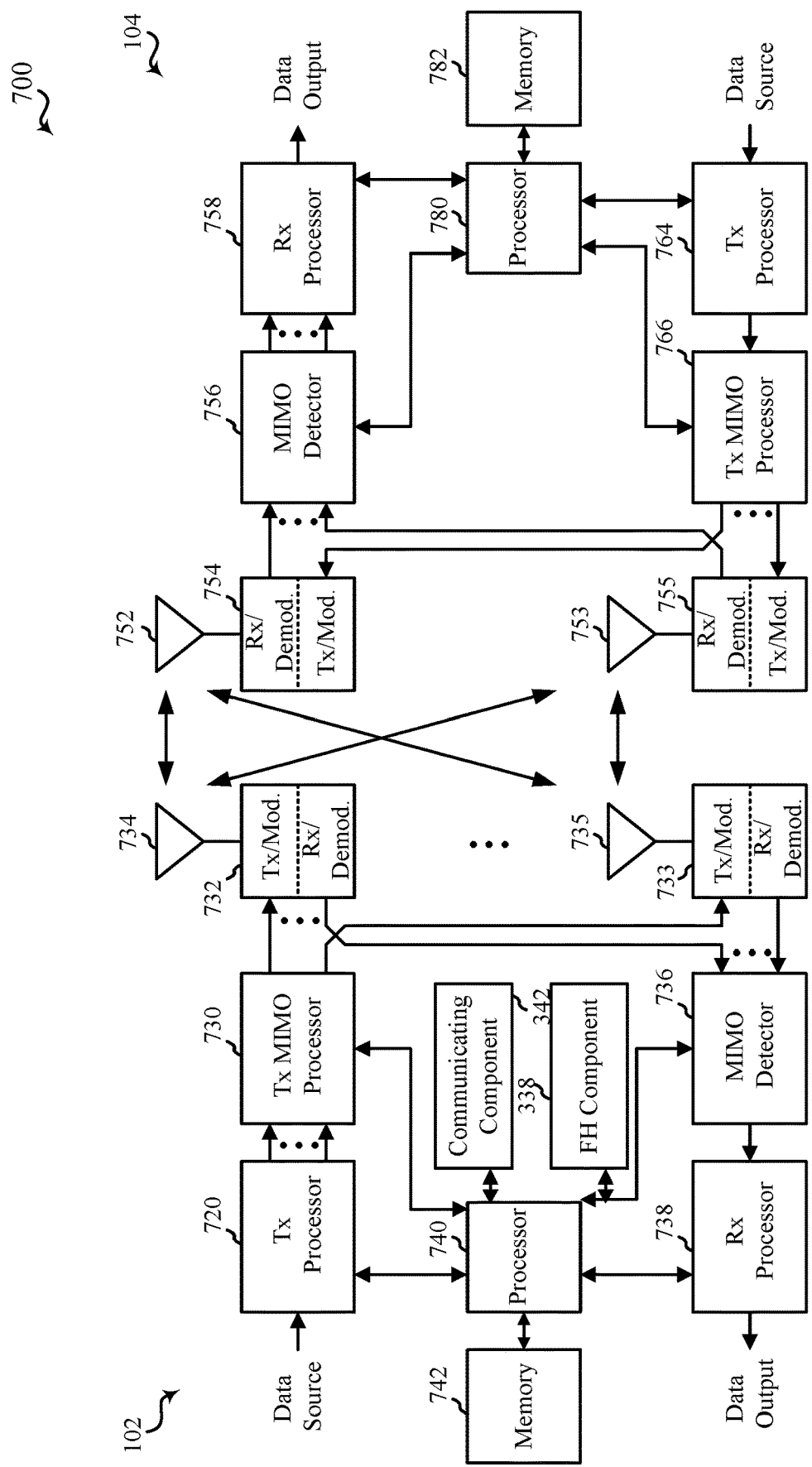
FIG. 7 is a block diagram illustrating an example of a MIMO communication system including a base station and a UE, in accordance with various aspects of the present disclosure.

FIG. 7 is a block diagram of a MIMO communication system 700 including a base station 102 (or DU or RU an upstream node) and a UE 104. The MIMO communication system 700 may illustrate aspects of the wireless communication access network 100 described with reference to FIG. 1. The base station 102 may be an example of aspects of the base station 102 described with reference to FIG. 1. The base station 102 may be equipped with antennas 734 and 735, and the UE 104 may be equipped with antennas 752 and 753. In the MIMO communication system 700, the base station 102 may be able to send data over multiple communication links at the same time. Each communication link may be called a "layer" and the "rank" of the communication link may indicate the number of layers used for communication. For example, in a 2×2 MIMO communication system where base station 102 transmits two "layers," the rank of the communication link between the base station 102 and the UE 104 is two.

At the base station 102, a transmit (Tx) processor 720 may receive data from a data source. The transmit processor 720 may process the data. The transmit processor 720 may also generate control symbols or reference symbols. A transmit MIMO processor 730 may perform spatial processing (e.g., precoding) on data symbols, control symbols, or reference symbols, if applicable, and may provide output symbol streams to the transmit modulator/demodulators 732 and 733. Each modulator/demodulator 732 through 733 may process a respective output symbol stream (e.g., for OFDM, etc.) to obtain an output sample stream. Each modulator/demodulator 732 through 733 may further process (e.g., convert to analog, amplify, filter, and upconvert) the output sample stream to obtain a DL signal. In one example, DL signals from modulator/demodulators 732 and 733 may be transmitted via the antennas 734 and 735, respectively.

The UE 104 may be an example of aspects of the UEs 104 described with reference to FIGS. 1-2. At the UE 104, the UE antennas 752 and 753 may receive the DL signals from the base station 102 and may provide the received signals to the modulator/demodulators 754 and 755, respectively. Each modulator/demodulator 754 through 755 may condition (e.g., filter, amplify, downconvert, and digitize) a respective received signal to obtain input samples. Each modulator/demodulator 754 through 755 may further process the input samples (e.g., for OFDM, etc.) to obtain received symbols. A MIMO detector 756 may obtain received symbols from the modulator/demodulators 754 and 755, perform MIMO detection on the received symbols, if applicable, and provide detected symbols. A receive (Rx) processor 758 may process (e.g., demodulate, deinterleave, and decode) the detected symbols, providing decoded data for the UE 104 to a data output, and provide decoded control information to a processor 780, or memory 782.

On the uplink (UL), at the UE 104, a transmit processor 764 may receive and process data from a data source. The transmit processor 764 may also generate reference symbols for a reference signal. The symbols from the transmit processor 764 may be precoded by a transmit MIMO processor 766 if applicable, further processed by the modulator/demodulators 754 and 755 (e.g., for SC-FDMA, etc.), and be transmitted to the base station 102 in accordance with the communication parameters received from the base station 102. At the base station 102, the UL signals from the UE 104 may be received by the antennas 734 and 735, processed by the modulator/demodulators 732 and 733, detected by a MIMO detector 736 if applicable, and further processed by a receive processor 738. The receive processor 738 may provide decoded data to a data output and to the processor 740 or memory 742.

The processor 740 may in some cases execute stored instructions to instantiate a communicating component 342 or FH component 338 (see e.g., FIGS. 2 and 3).

The components of the UE 104 may, individually or collectively, be implemented with one or more ASICs adapted to perform some or all of the applicable functions in hardware. Each of the noted modules may be a means for performing one or more functions related to operation of the MIMO communication system 700. Similarly, the components of the base station 102 may, individually or collectively, be implemented with one or more ASICs adapted to perform some or all of the applicable functions in hardware. Each of the noted components may be a means for performing one or more functions related to operation of the MIMO communication system 700.

The following aspects are illustrative only and aspects thereof may be combined with aspects of other embodiments or teaching described herein, without limitation.

Aspect 1 is a method for wireless communication including sending, from a DU, a control signal that is transparent to communications on an uplink data channel and a random access channel, receiving, at the DU, a frequency domain signal from a RU over resources for the random access channel, and based on determining that the frequency domain signal is received over the resources for the random access channel, applying a phase compensation to the frequency domain signal to extract a random access communication from the signal.

In Aspect 2, the method of Aspect 1 includes where the frequency domain signal received from the RU has a cyclic prefix associated with the uplink data channel removed, where the phase compensation or processing specific random access channel numerology being different than uplink shared channel numerology is based on the cyclic prefix.

In Aspect 3, the method of Aspect 2 includes where the phase compensation is based on a difference between the cyclic prefix of uplink shared channel and a second cyclic prefix associated with the random access channel.

In Aspect 4, the method of any of Aspects 1 to 3 includes where sending the control signal comprises, sending a downlink control plane message of section type 1 for random access channel.

In Aspect 5, the method of Aspect 4 includes where the downlink control plane message includes one or more parameters for receiving the random access communication at the RU.

In Aspect 6, the method of any of Aspects 1 to 5 includes applying a compensation to the frequency domain signal to account for a difference in numerology between the uplink data channel and the random access channel.

In Aspect 7, the method of claim 1 includes where the frequency domain signal received from the RU has a fast Fourier transform applied to put the frequency domain signal in a frequency domain.

Aspect 8 is a method for wireless communication including receiving, at a RU, a control signal that is transparent to communications on an uplink data channel and a random access channel, receiving, at the RU, a signal over resources for the random access channel, removing, based on the control signal, a cyclic prefix associated with the uplink data channel from one or more symbols of the signal, performing a FFT of the one or more symbols to extract a frequency domain random access communication from the signal, and sending, to a DU, the frequency domain random access communication.

In Aspect 9, the method of Aspect 8 includes where the control signal includes a downlink control plane message of section type 1 based on the uplink data channel and random access channel having same numerology.

Aspect 10 is a method for wireless communication including sending, from a DU to a RU, a control signal that is transparent to communications on an uplink data channel and a random access channel, receiving, at the DU, a signal from the RU over resources for the random access channel, and decoding a random access communication from the signal at least in part by applying a phase compensation to the signal.

In Aspect 11, the method of Aspect 10 includes where the signal received from the RU has a cyclic prefix associated with the uplink data channel removed, where the phase compensation is based on the cyclic prefix.

In Aspect 12, the method of Aspect 11 includes where the phase compensation is based on a phase difference between the cyclic prefix of uplink shared channel and a second cyclic prefix associated with the random access channel.

In Aspect 13, the method of any of Aspects 11 or 12 includes processing, based on the cyclic prefix, the signal according to a random access channel numerology being different than uplink shared channel numerology.

In Aspect 14, the method of any of Aspects 10 to 13 includes where sending the control signal comprises, sending a downlink control plane message of section type 1 for the random access channel.

In Aspect 15, the method of Aspect 14 includes where the downlink control plane message includes one or more parameters for receiving the random access communication at the RU.

In Aspect 16, the method of any of Aspects 10 to 15 includes applying a phase compensation to the signal to account for a difference in numerology between the uplink data channel and the random access channel.

In Aspect 17, the method of any of Aspects 10 to 16 includes where the signal received from the RU has a FFT applied.

In Aspect 18, the method of any of Aspects 10 to 17 includes receiving, at the RU, a signal over resources for the random access channel, removing, by the RU and based on the control signal, a cyclic prefix associated with the uplink data channel from one or more symbols of the signal, performing, by the RU, a FFT of the one or more symbols to decode the random access communication from the signal, and sending, to a DU, the signal with the random access communication.

In Aspect 19, the method of Aspect 18 includes where the control signal includes a downlink control plane message of section type 1 based on the uplink data channel and random access channel having same numerology.

Aspect 20 is an apparatus for wireless communication including a transceiver, a memory configured to store instructions, and one or more processors communicatively coupled with the memory and the transceiver, where the one or more processors are configured to perform one or more of the methods of any of Aspects 1 to 19.

Aspect 21 is an apparatus for wireless communication including means for performing one or more of the methods of any of Aspects 1 to 19.

Aspect 22 is a computer-readable medium including code executable by one or more processors for wireless communications, the code including code for performing one or more of the methods of any of Aspects 1 to 19.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially programmed device, such as but not limited to a processor, a digital signal processor (DSP), an ASIC, a field programmable gate array (FPGA) or other programmable logic device, a discrete gate or transistor logic, a discrete hardware component, or any combination thereof designed to perform the functions described herein. A specially programmed processor may be a microprocessor, but in the alternative, the processor may be any conventional processor, controller, microcontroller, or state machine. A specially programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. An apparatus for wireless communication, comprising:
   a memory; and
   one or more processors coupled to the memory, wherein the one or more processors are configured to cause the apparatus to:
      send, to a radio unit (RU), a downlink control plane message of section type 1 for a random access channel with a same numerology as an uplink data channel; and
      receive a signal from the RU over resources for the random access channel.

2. The apparatus of claim 1, wherein the one or more processors are further configured to cause the apparatus to:
   decode a random access communication from the signal at least in part by applying a phase compensation to the signal, wherein the signal received from the RU has a cyclic prefix associated with the uplink data channel removed, and wherein the phase compensation is based on the cyclic prefix.

3. The apparatus of claim 2, wherein the phase compensation is based on a phase difference between the cyclic prefix of uplink shared channel and a second cyclic prefix associated with the random access channel.

4. The apparatus of claim 1, wherein the downlink control plane message includes one or more parameters for receiving a random access communication at the RU.

5. The apparatus of claim 1, wherein the signal received from the RU has a Fast Fourier Transform (FFT) applied.

6. The apparatus of claim 1, wherein the downlink control plane message of section type 1 indicates the resources.

7. A method of wireless communication performed by a distributed unit (DU), comprising:
   sending, to a radio unit (RU), a downlink control plane message of section type 1 for a random access channel with a same numerology as an uplink data channel; and
   receiving a signal from the RU over resources for the random access channel.

8. The method of claim 7, further comprising:
   decoding a random access communication from the signal at least in part by applying a phase compensation to the signal, wherein the signal received from the RU has a cyclic prefix associated with the uplink data channel removed, and wherein the phase compensation is based on the cyclic prefix.

9. The method of claim 8, wherein the phase compensation is based on a phase difference between the cyclic prefix of uplink shared channel and a second cyclic prefix associated with the random access channel.

10. The method of claim 7, wherein the downlink control plane message includes one or more parameters for receiving a random access communication at the RU.

11. The method of claim 7, wherein the signal received from the RU has a Fast Fourier Transform (FFT) applied.

12. The method of claim 7, wherein the downlink control plane message of section type 1 indicates the resources.

13. A non-transitory computer-readable storage medium having instructions stored thereon that, when executed by an apparatus, causes the apparatus to:
   send, to a radio unit (RU), a downlink control plane message of section type 1 for a random access channel with a same numerology as an uplink data channel; and
   receive a signal from the RU over resources for the random access channel.

14. The non-transitory computer-readable storage medium of claim 13, wherein the instructions, when executed, further cause the apparatus to:
   decode a random access communication from the signal at least in part by applying a phase compensation to the signal, wherein the signal received from the RU has a cyclic prefix associated with the uplink data channel removed, and wherein the phase compensation is based on the cyclic prefix.

15. The non-transitory computer-readable storage medium of claim 14, wherein the phase compensation is based on a phase difference between the cyclic prefix of uplink shared channel and a second cyclic prefix associated with the random access channel.

16. The non-transitory computer-readable storage medium of claim 13, wherein the downlink control plane message of section type 1 indicates the resources.

17. An apparatus for wireless communication, comprising:
   a memory; and
   one or more processors coupled to the memory, wherein the one or more processors are configured to cause the apparatus to:
      send, to a radio unit (RU), a downlink control plane message of section type 1 for a random access channel with a same numerology as an uplink data channel; and receive a signal from the RU over resources for the random access channel, wherein the downlink control plane message of section type 1 indicates the resources.

* * * * *